(12) United States Patent
Boys et al.

(10) Patent No.: US 11,646,152 B2
(45) Date of Patent: May 9, 2023

(54) CURRENT DISTRIBUTION AND THERMAL REGULATION IN INDUCTIVE POWER TRANSFER COUPLING STRUCTURES

(71) Applicant: Auckland UniServices Limited, Auckland (NZ)

(72) Inventors: John Talbot Boys, Auckland (NZ); Grant Anthony Covic, Auckland (NZ); Michael John Neath, Auckland (NZ); Adeel Zaheer, Munich (DE); Hui Zhi Beh, Auckland (NZ)

(73) Assignee: AUCKLAND UNISERVICES LIMITED, Auckland (NZ)

(*) Notice: Subject to any disclaimer, the term of this patent is extended or adjusted under 35 U.S.C. 154(b) by 854 days.

(21) Appl. No.: 16/464,198

(22) PCT Filed: Nov. 27, 2017

(86) PCT No.: PCT/NZ2017/050150
§ 371 (c)(1),
(2) Date: May 24, 2019

(87) PCT Pub. No.: WO2018/097739
PCT Pub. Date: May 31, 2018

(65) Prior Publication Data
US 2019/0378650 A1    Dec. 12, 2019

(30) Foreign Application Priority Data
Nov. 25, 2016   (NZ) .......................... 726791

(51) Int. Cl.
H01F 38/14    (2006.01)
H01F 27/08    (2006.01)
(Continued)

(52) U.S. Cl.
CPC .............. *H01F 38/14* (2013.01); *H01F 27/08* (2013.01); *H01F 27/22* (2013.01); *H01F 27/2823* (2013.01); *H01F 27/2871* (2013.01); *H01F 27/36* (2013.01); *H01F 27/366* (2020.08); *H01F 2027/2838* (2013.01)

(58) Field of Classification Search
CPC .......... H01F 38/14; H01F 27/08; H01F 27/22; H01F 27/2823; H01F 27/2871;
(Continued)

(56) References Cited

U.S. PATENT DOCUMENTS

2002/0084027 A1* 7/2002 Terano ................ B29C 65/3668
                                                  156/272.4
2012/0217111 A1    8/2012 Boys et al.
(Continued)

FOREIGN PATENT DOCUMENTS

WO    WO-2011016736 A2    2/2011
WO    WO-2018097739 A1    5/2018

OTHER PUBLICATIONS

"International Application No. PCT/NZ2017/050150, International Preliminary Report on Patentability dated May 28, 2019", (May 28, 2019), 7 pgs.
(Continued)

*Primary Examiner* — Lincoln D Donovan
*Assistant Examiner* — Alex W Lam
(74) *Attorney, Agent, or Firm* — Piloff Passino & Cosenza LLP; Martin J. Cosenza

(57) ABSTRACT

A magnetic structure for wireless power transfer has a plurality of pieces of magnetically permeable material arranged along a first dimension. Each piece is separated from a neighbouring piece by a gap defining a separation distance which is selected to prevent partial saturation of a region of the structure.

25 Claims, 12 Drawing Sheets

(51) Int. Cl.
*H01F 27/28* (2006.01)
*H01F 27/36* (2006.01)
*H01F 27/22* (2006.01)

(58) Field of Classification Search
CPC .......... H01F 27/36; H01F 27/366; H01F 2027/2838; H01F 27/18; H01F 27/24; H01F 27/28; H01F 2007/1888; Y02T 10/7072; Y02T 90/12; Y02T 90/14; Y02T 10/70; B60L 53/34; H02J 50/80; H02J 50/12; H02J 50/70; H02J 50/50; H02J 50/10; H02J 5/005; H02J 50/20; H02J 7/025; H02J 7/007; H02J 7/00034; H02J 7/00045; H02J 7/0042; H02J 7/0027; H02J 7/2434; H02J 50/60; H02J 50/90; H02J 50/40; H02J 50/402
See application file for complete search history.

(56) References Cited

U.S. PATENT DOCUMENTS

| | | | |
|---|---|---|---|
| 2013/0033118 A1* | 2/2013 | Karalis | H02J 50/60 307/104 |
| 2014/0111151 A1 | 4/2014 | Keeling et al. | |
| 2015/0302985 A1 | 10/2015 | Kurs | |
| 2016/0012967 A1 | 1/2016 | Kurs et al. | |

OTHER PUBLICATIONS

"International Application No. PCT/NZ2017/050150, International Search Report and Written Opinion dated Apr. 17, 2018", (Apr. 17, 2018), 14 pgs.

Covic, Grant A., "Inductive Power Transfer", Proceedings of the IEEE, vol. 101, No. 6, Jun. 2013, (Jun. 2013), 1276-1289.

* cited by examiner

A simple trifilar winding where only the self-inductance of each parallel current path is balanced A trifilar winding where both the self and mutual-inductance values of each parallel current path are balanced A Double-D quad filar winding pattern A prototype of a quadfilar Double D pad A single coil quadfilar winding pattern

CURRENT DISTRIBUTION AND THERMAL REGULATION IN INDUCTIVE POWER TRANSFER COUPLING STRUCTURES

PRIORITY CLAIM TO RELATED APPLICATIONS

This application is a U.S. national stage filing under 35 U.S.C. § 371 from International Application No. PCT/NZ2017/050150, filed on 27 Nov. 2017, and published as WO2018/097739 on 31 May 2018, which claims the benefit under 35 U.S.C. 119 to New Zealand Application No. 726791, filed on 25 Nov. 2016, the benefit of priority of each of which is claimed herein, and which applications and publication are hereby incorporated herein by reference in their entirety.

FIELD OF THE INVENTION

The technical field relates generally to wireless power transfer, and more specifically to devices, systems, and methods related to wireless power transfer. More particularly, the present disclosure relates to magnetic coupling structures and winding arrangements used in wireless power transfer systems, and in particular inductive power transfer (IPT) systems.

BACKGROUND

Remote systems, such as personal electronic devices or vehicles, have been introduced that include power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge remote systems such as electric vehicles and other devices may overcome some of the deficiencies of wired charging solutions. As such, wireless charging systems and methods that efficiently and safely transfer power for charging devices are desirable.

One system of wireless power transfer is inductive power transfer (IPT). In IPT, power is transferred from a primary power device to a secondary (or "pick-up") power device. Typically, each device includes one or more windings of electric current conveying media, such as wires.

International patent publication WO 2011/016736 discloses an IPT system which may be used for powering a wide variety of devices, including electric vehicles, in which a base (usually the primary) winding, typically positioned on the ground, consists of two separate co-planar coils positioned above a core arrangement formed from a material of high magnetic permeability, such as ferrite. In this arrangement, there is no straight path through the core that passes through the coils. As such, the coils act as pole areas and lines of magnetic flux arc between them in the form of a "flux pipe" that extends in a path through the ferrite beneath the coils, though the pole areas and in an arc above the coils, which provides a zone of high flux concentration for wireless power transfer at a distance above the coils. Advantageously, the arrangement results in little leakage of flux below the coils on the side of the core.

In general with IPT systems, it is desirable for the primary winding to have a low inductance. A winding with a high inductance is difficult to drive at high frequencies because large voltages are required across the coil terminals. In addition, it is difficult to form a winding with a low inductance that has sufficiently large physical area to be capable of charging a device such as an electric vehicle while at the same time keeping the winding physically thin. A physically thin winding is unobtrusive and is advantageous in wireless power transfer systems for electric vehicles where base or primary windings are positioned at ground level and the vehicle is charged by positioning a pick-up coil over the base winding. This is because some base windings could be positioned on top of the ground surface whereas others could be embedded in it. The thinner the base winding, the smaller the relative difference in the gap between the base and pick-up windings in these two situations. The base winding inductance may be tuned to an expected winding separation distance for optimal charging. As a result, a thin base winding means greater tolerance to different installations of a base winding relative to the ground.

Typical base windings are designed with a specific inductance and to work at a specified frequency and current to ensure optimal charging of batteries connected to pick-up windings designed with complimentary characteristics. Attempting to charge pick-up windings that are sub-optimally compatible with the base winding can lead to slow charging times, energy waste or overheating components. However, different types or models of vehicles may have different pick-up windings or batteries. It is therefore desirable for base chargers in a wireless charging system to be able to charge vehicles of differing characteristics with minimal loss of efficiency.

As mentioned above, winding arrangements are typically provided in magnetic association with a magnetic structure comprising a material of high magnetic permeability, such as ferrite, which may be referred to as a core, despite the winding or coils that comprise the winding not necessarily being wound around the magnetically permeable material. The problem of suitable construction of high power base winding arrangements suitable for burying in a road environment is a significant issue especially where ferrite is used for the core material.

The majority of high power IPT systems have been designed for operation at 20 kHz, however present standards are choosing 85 kHz as the desired frequency for operation for stationary wireless charging, which places stresses on both the amount of ferrite required to manage the core losses and the impact of skin effect and proximity losses in the current carrying wire from which the winding or windings are formed (typically copper).

At 85 kHz the core losses can be significant higher (more than 5-6 times that of 20 kHz) systems carrying a given flux density, meaning that to manage the losses the core may need to be significantly larger to lower the average flux density to avoid thermal issues. This exacerbates the risk of damage in a road environment given ferrite is brittle and can fracture causing additional loss problems.

At these higher frequencies there is an even greater need to keep the inductance of the winding arrangement low to manage voltage stress and associated compensation elements while also avoiding corona discharges. But at higher power, a larger flux needs to be coupled to the secondary and this forces the NI in the current carrying copper wires (the number of winding turns multiplied by the current magnitude) to be increased. Given the inductance is proportional to the turns squared, then it is better to increase the current magnitude and this either requires thicker current carrying wires or multiple filars laid in parallel to carry the total current magnitude. However, multifilar windings add additional problems in that proximity affects can mean that unequal current flows in the parallel wires. This unequal current distribution in the copper further exacerbates the potential for further losses.

Quite apart from lowering efficiency, these losses all contribute to overheating of the winding arrangement which is a further problem. For these reasons only single filar or bifilar windings are typically used in high power pads.

SUMMARY

In one broad aspect the invention provides a magnetic structure for a magnetic flux coupling apparatus, the structure comprising:
a plurality of pieces of magnetically permeable material arranged along a first dimension, each piece being separated from a neighbouring piece by a gap defining a separation distance, and
wherein the separation distance is selected to prevent partial saturation of a selected region of the structure.

The separation distance provides a lower relative permeability in the selected region of the structure. It may also provide an overall lower relative permeability for the structure relative to the relative permeability of the magnetically permeable material.

The pieces of magnetically permeable material may move relative to each other in a direction transverse to the first dimension.

The plurality of pieces of magnetically permeable material may comprise a length of permeable material, and the magnetic structure comprises a plurality of lengths of permeable material. The lengths can be arranged in parallel to form a plane.

A heat transfer means such as a heat pipe can be provided between the lengths.

The gap comprises a low permeability material having a lower relative permeability than the magnetically permeable material. The separation distance and the low permeability material are selected to prevent partial saturation of the selected region.

A conductor may be magnetically associated with the ferrite. The selected region is preferably adjacent to the conductor, or a plurality of turns of the conductor. The conductor, or a plurality of turns of the conductor, can be arranged substantially transverse to the first dimension at the selected region.

In one example, the conductor is wound to provide two poles, and the gap is positioned to provide high or maximum relative permeability between the poles.

The conductor can comprise a multifilar winding having one or more turns wherein each filar crosses the other filars at a crossing point such that the inductance of each filar is substantially the same, and the crossing point is located in between the lengths of permeable material.

In another broad aspect there is provided magnetic flux coupling apparatus comprising:
a multifilar winding comprising one or more turns,
wherein the mean area circumscribed by each filar is substantially equal.

In another broad aspect there is provided magnetic flux coupling apparatus comprising:
a mulitfilar winding comprising one or more turns of M filars,
wherein each filar crosses the other filars M, or M−1, or M+1 times per turn.

In another broad aspect there is provided a magnetic flux coupling apparatus comprising:
a mulitfilar winding comprising one or more turns wherein the filars are physically arranged relative to each other such that the inductance of each filar is substantially the same.

The inductance of each filar may comprises the sum of the self and mutual inductances for that filar.

In another broad aspect there is provided magnetic flux coupling apparatus comprising:
a mulitfilar winding comprising one or more turns of M filars,
wherein the mean area circumscribed by each filar is substantially equal and wherein each filar crosses the other filars M, or M−1, or M+1 times per turn.

In some embodiments the length of filars between each crossing is substantially equal.

The apparatus may further comprise a magnetically permeable material which is magnetically associated with the winding.

In some embodiments the crossings are located dependent upon a characteristic of the permeable material, such as a recess or gap in the magnetic material.

In another broad aspect there is provided a magnetic structure for a magnetic flux coupling apparatus, the structure comprising:
a plurality of pieces of ferrite arranged along a first dimension, each piece being separated from a neighbouring piece by a gap defining a separation distance and wherein the separation distance is selected such that the core has a required relative permeability.

In some embodiments the required relative permeability is in the range of: 50-2000, or 50-500, or 100-500, or 100-300. In some embodiments the relative permeability may be 100, 200, 300 or 400.

In some embodiments another material is provided in one or more of the gaps. The other material may have a selected relative permeability which is further used to provide the required relative permeability for the structure. The other material may comprise Mylar.

In some embodiments the separation distance is in the range of substantially 0.1 mm to 0.5 mm, or 0.1 to 0.3 mm.

In some embodiments the separation distance may vary to provide gaps of differing dimensions.

In some embodiments the separation distance and the property of any material in the gap are selected to provide a required operating temperature when the structure is magnetically associated with a coil energised with a required current at a required frequency.

In some embodiments the separated ferrite pieces are arranged along the first dimension to provide discontinuous elongate strips. The cumulative separation distance along the strip may be in the range of 1 mm to 3 mm, or 1 mm to 2 mm.

In another broad aspect there is provided a magnetic structure for a magnetic flux coupling apparatus, the structure comprising:
a plurality of pieces of ferrite arranged along a first dimension, each piece being separated from a neighbouring piece by a gap defining a separation distance and wherein the separation distance is selected to prevent partial saturation of a selected a region of the structure.

In one embodiment the selected region comprises an edge region of the structure.

In another broad aspect there is provided a magnetic structure for a magnetic flux coupling apparatus, the structure comprising:

a plurality of lengths of magnetically permeable material arranged substantially in parallel and a heat transfer means provided between at least two of the lengths.

In one embodiment the heat transfer means comprises a heat pipe.

A backplate may be provided. The heat transfer means may transfer heat from the magnetically permeable material to the back plate.

Further aspects of the disclosure will become apparent from the following description

DRAWING DESCRIPTION

One or more embodiments will be described with reference to the accompanying drawings, in which.

Figure 4:
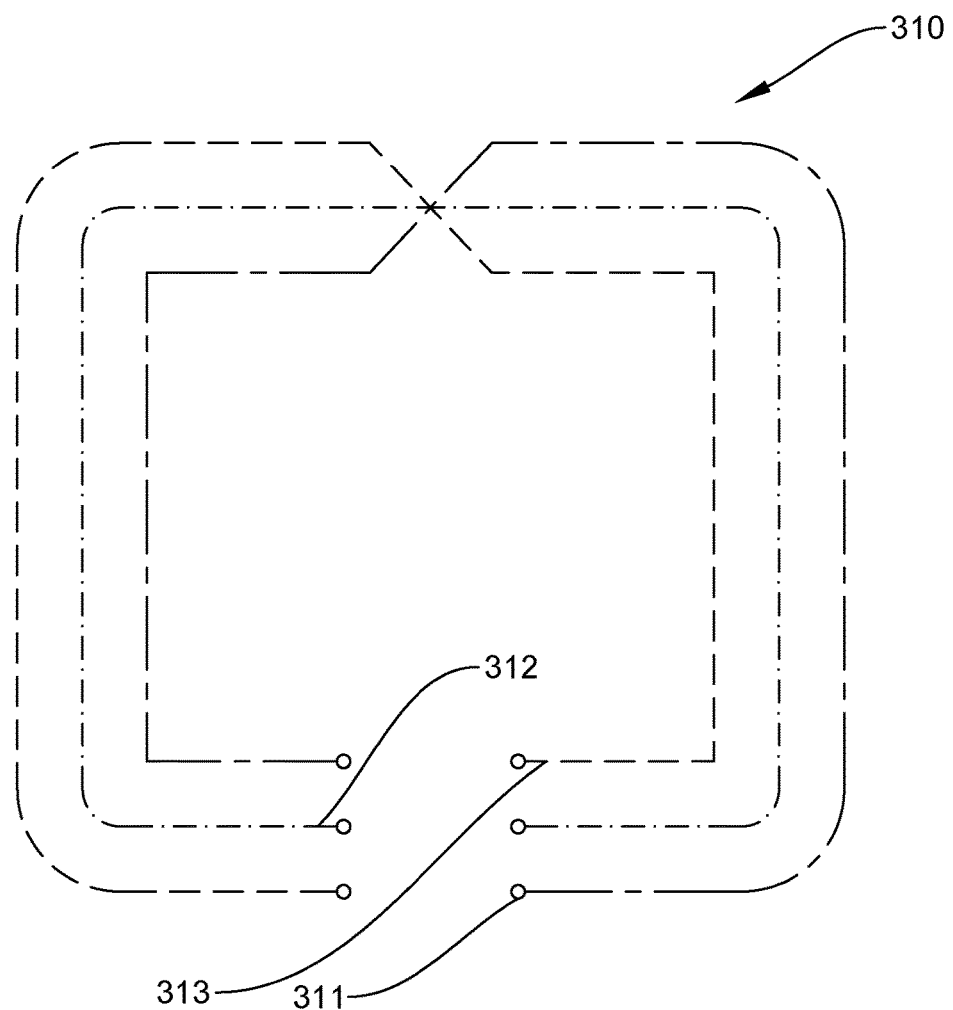

FIG. 4 is a diagrammatic plan view of a trifilar winding arrangement which has balanced self inductance for each filar i.e. the self inductance of each filar is substantially equal. A table of measured inductances is also shown. In the table each row represents one filar and each column represents one filar. Thus row 1 column 1 represents the self inductance of filar 1, row 2 column 2 represents the self inductance of filar 2, row 1 column 2 represents the mutual inductance between filar 1 and filar 2. A table of measured current in each filar is also shown in which each row represents one filar.

Figure 5:
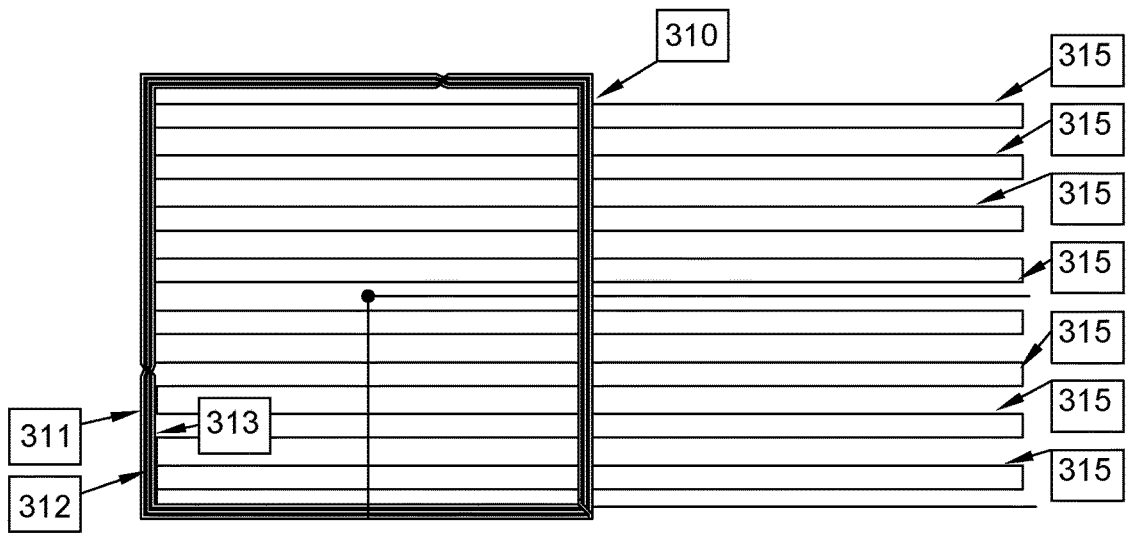
Figure 6:
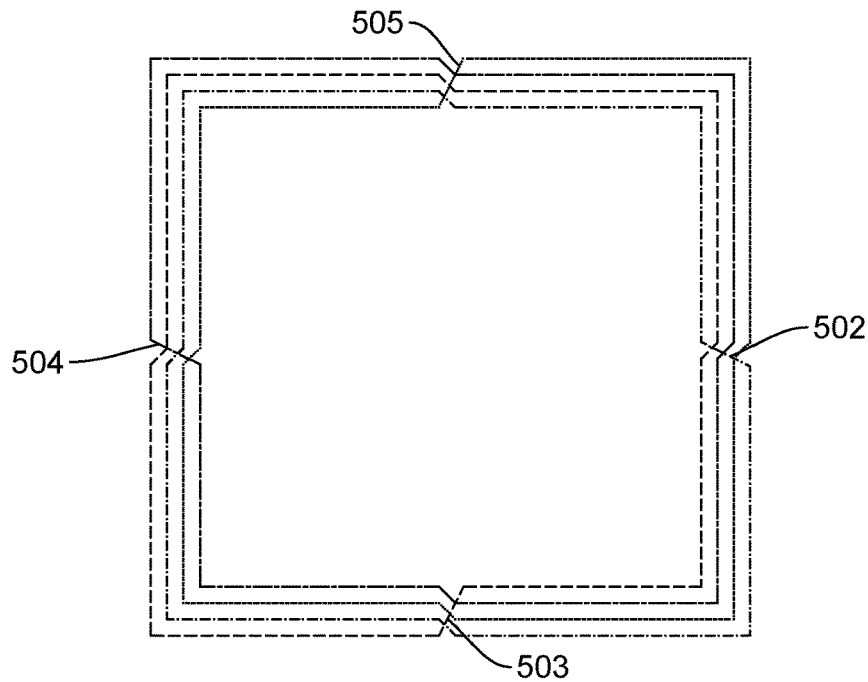
Figure 7:
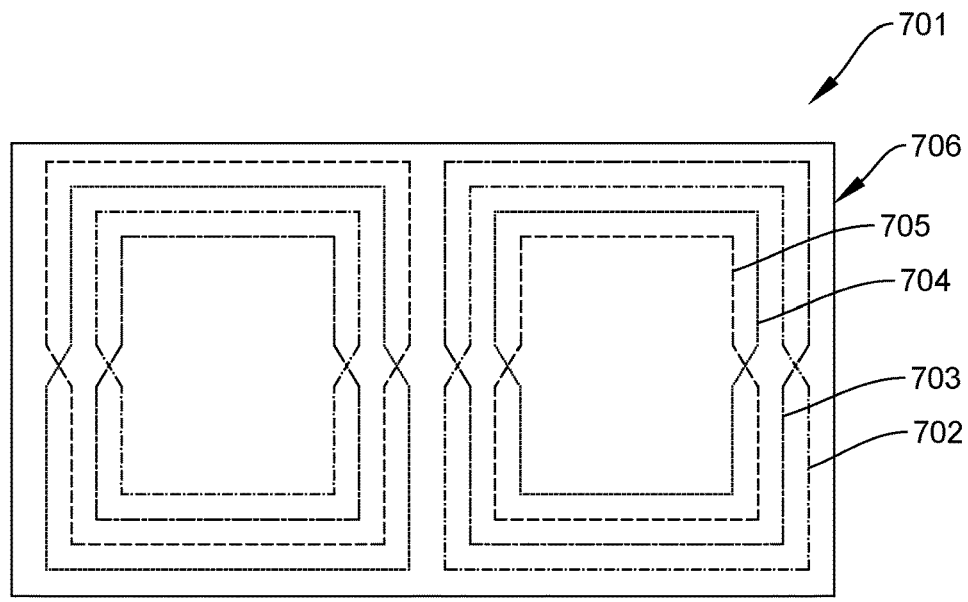
Figure 8:
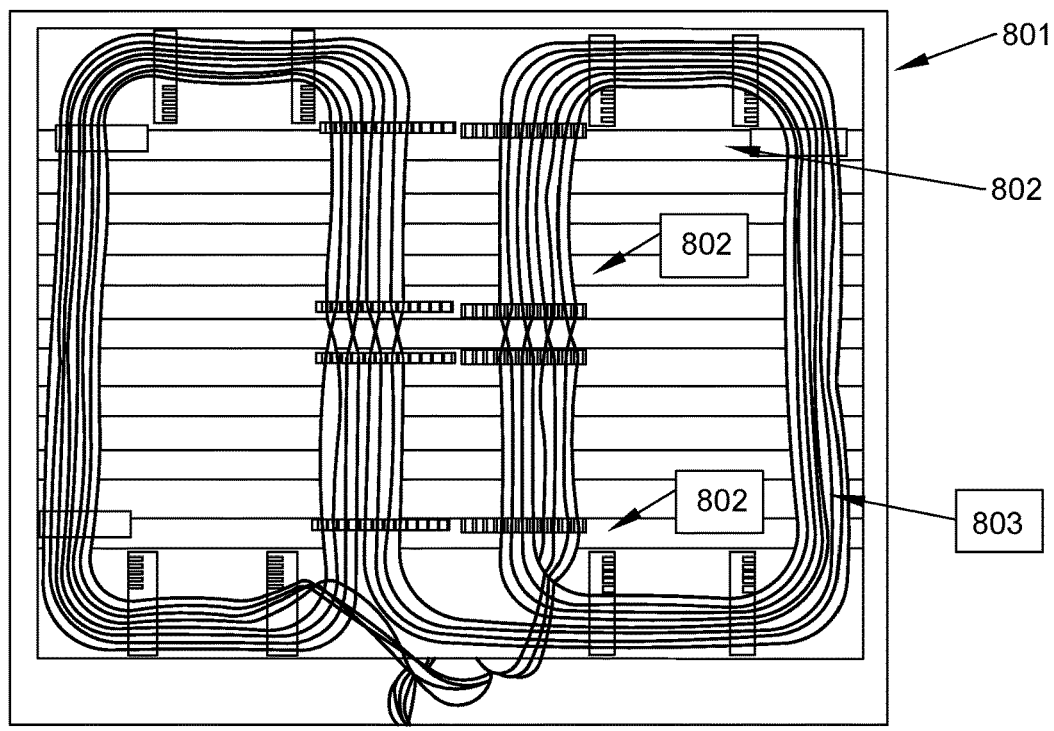
Figure 8A:
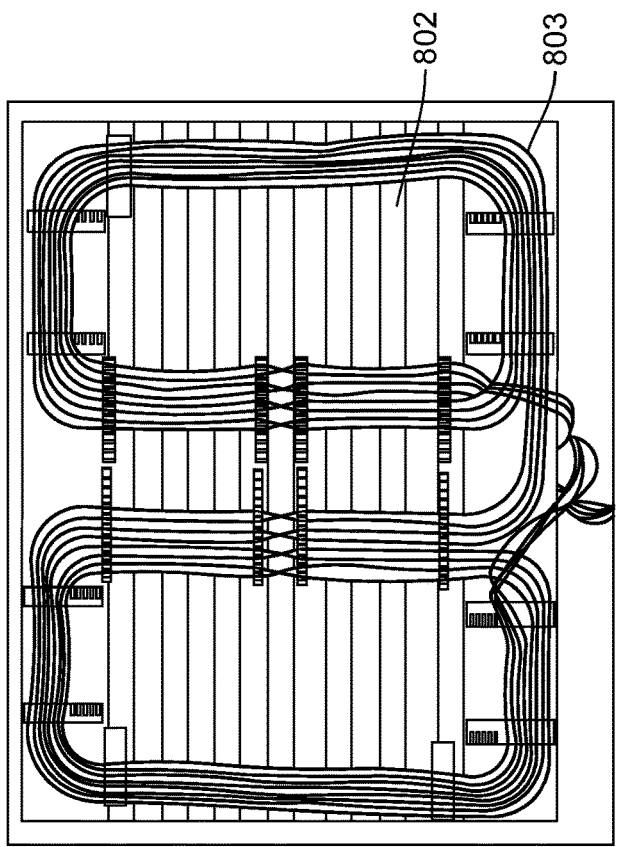
Figure 8A:
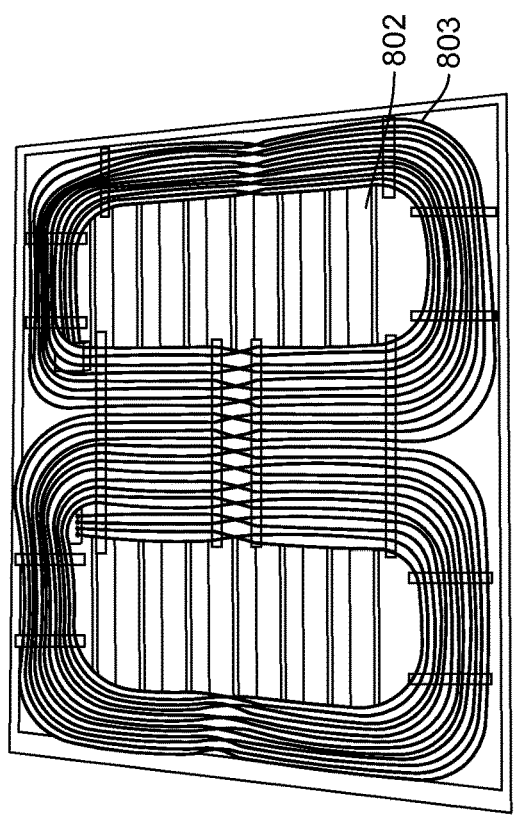
Figure 9:
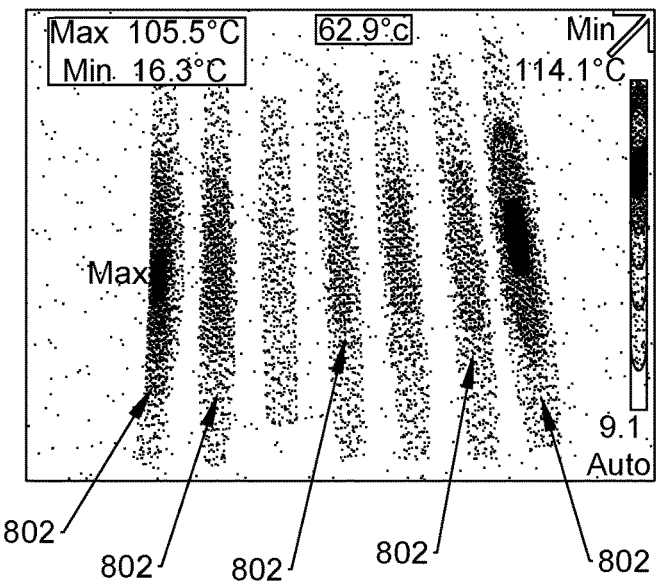
Figure 10:
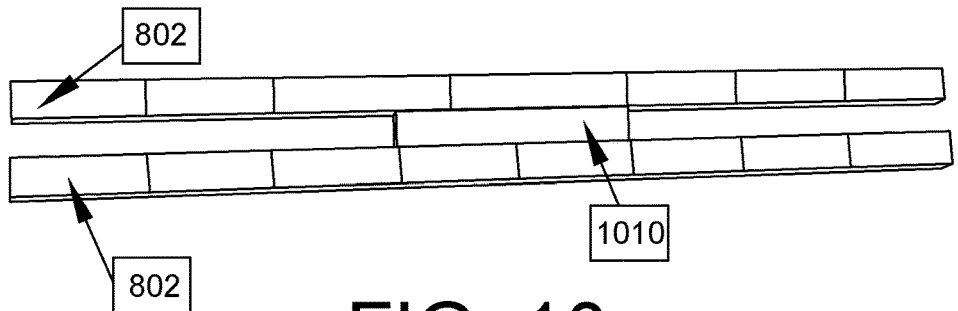
Figure 11:
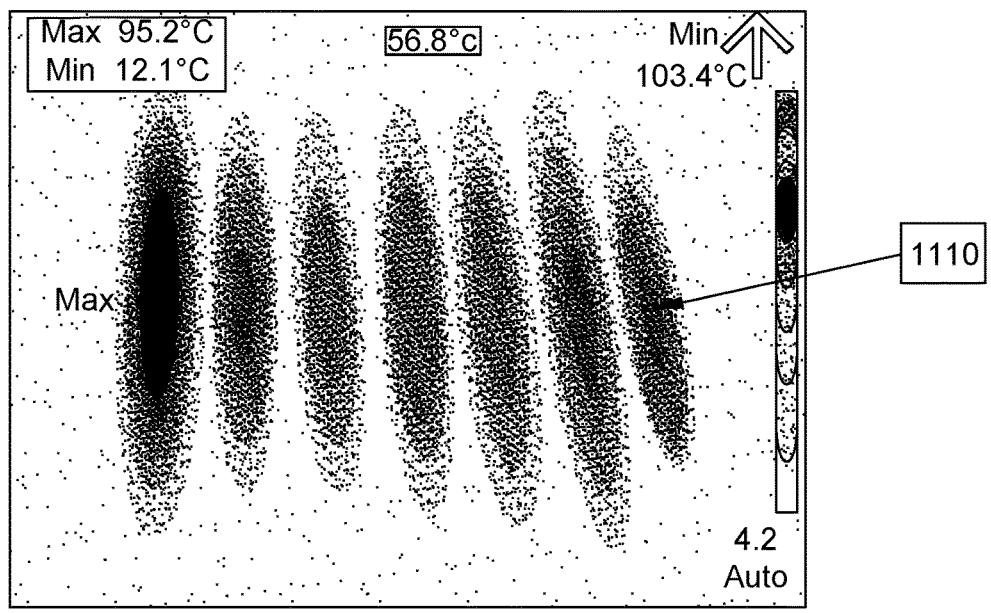
Figure 12:
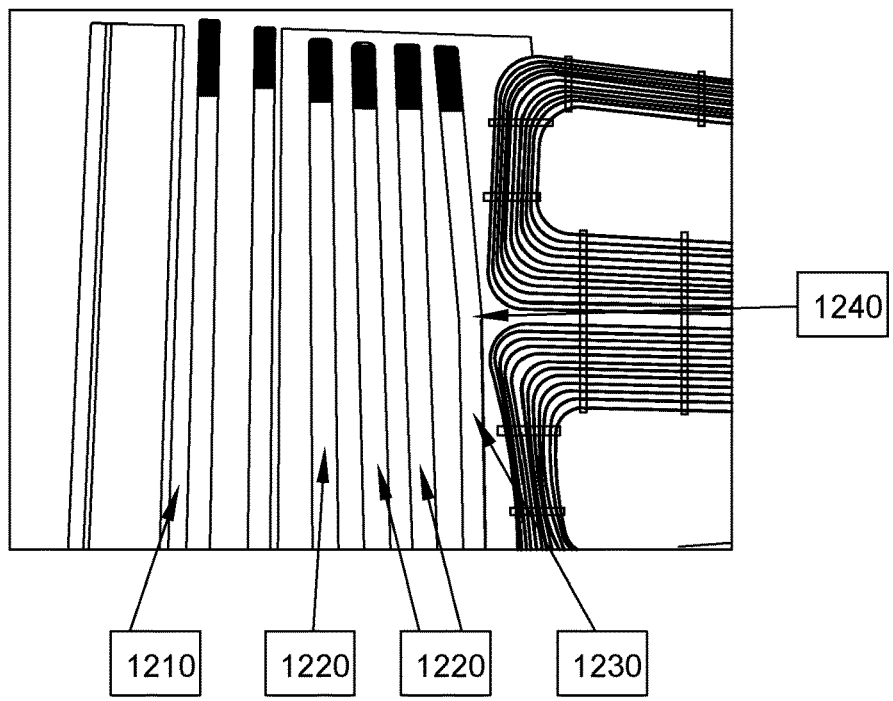
Figure 13:
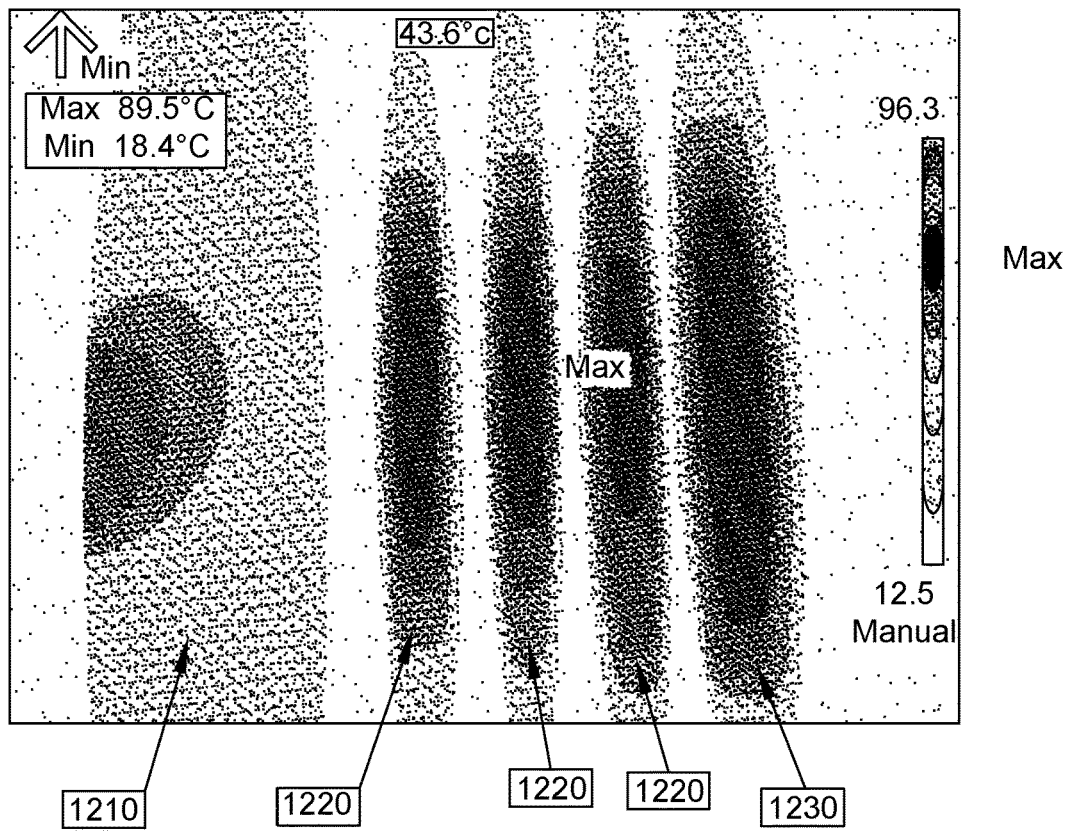
Figure 14:
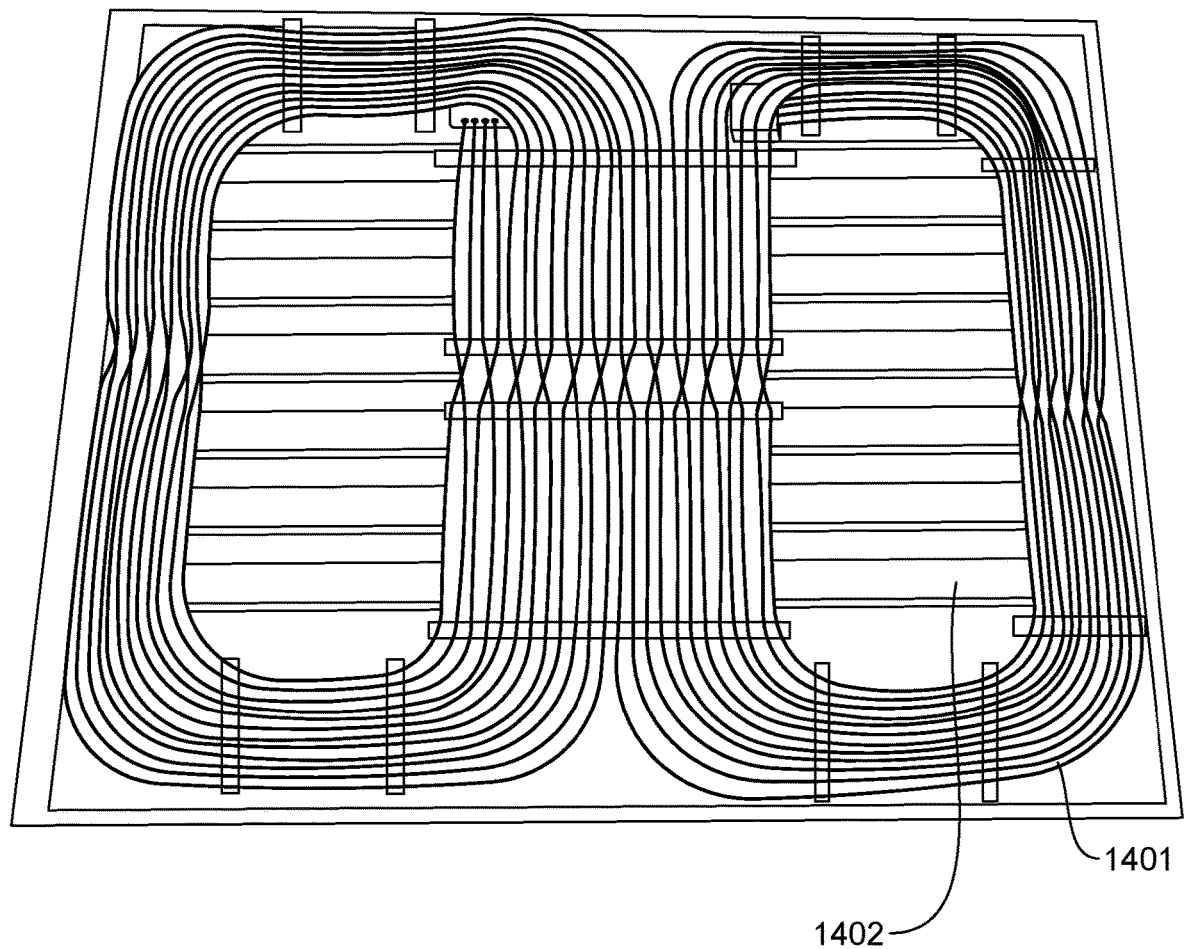
Figure 15:
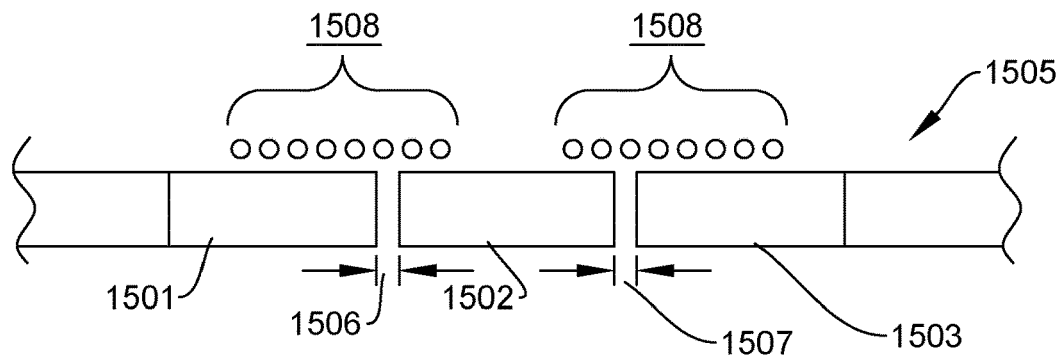
Figure 16:
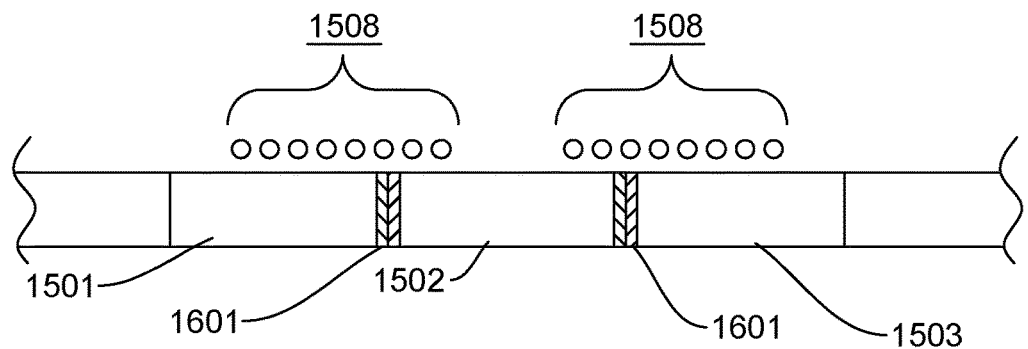
Figure 17:
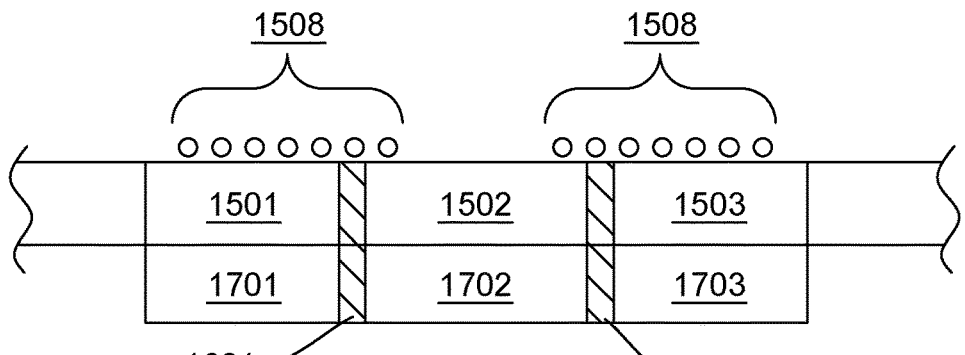
Figure 18:
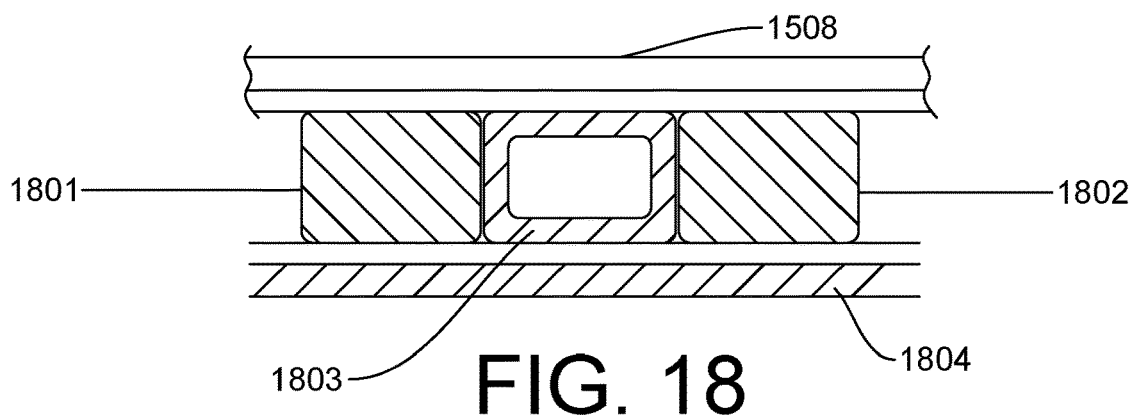
Figure 19:
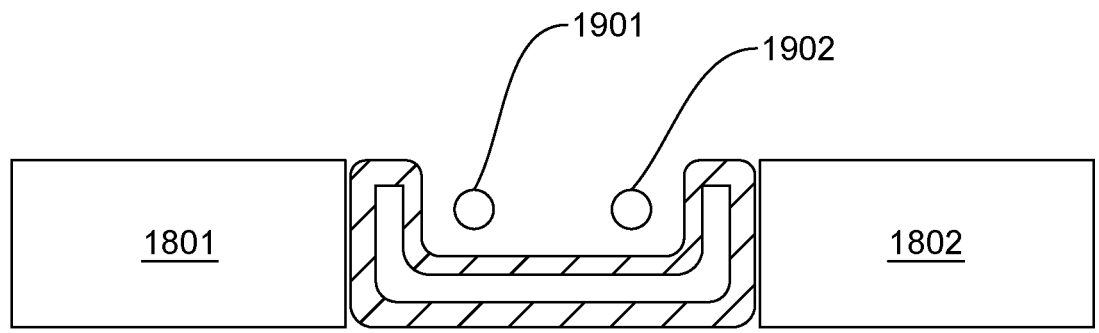
Figure 20:
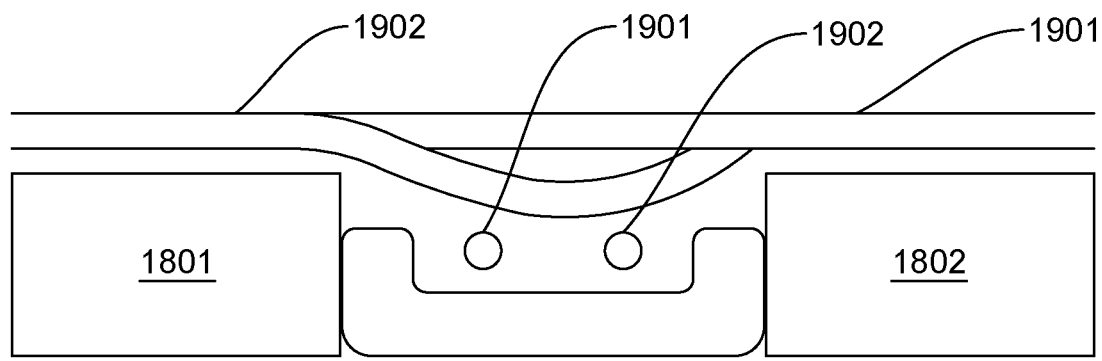

FIG. 5 is is a diagrammatic plan view of a trifial winding arrangement which has balanced self inductance and mutual inductance for each filar i.e. the self inductance and mutual inductances for each filar are substantially equal. A table of measured inductances is also shown. In the table each row represents one filar and each column represents one filar. Thus row 1 column 1 represents the self inductance of filar 1, row 2 column 2 represents the self inductance of filar 2, row 1 column 2 represents the mutual inductance between filar 1 and filar 2. It can be seen that the total inductance for each row is substantially equal. A table of measured current in each filar is also shown in which each row represents one filar. The currents are substantially equal, corresponding to the substantially equal inductances;

FIG. 6 is a diagrammatic illustration in plan view for a quadfilar winding arrangement with balanced inductances;

FIG. 7 is a conceptual illustration in plan view of a quadfilar winding arrangement for use as a DD arrangement with balanced inductances. It will be seen that the winding terminations are omitted, but these are apparent in the practical embodiment shown in FIG. 8;

FIG. 8 is a plan view of a practical quadfilar DD winding arrangement with balanced inductances;

FIG. 8A shows two practical winding arrangements. The arrangement on the left does not have balanced inductances between filars. It should be noted that the illustration on the left comprises a bifilar arrangement yet the accompanying table below the illustration relates to measurements for a quadfilar construction that does not have balanced inductances between filars. The arrangement illustrated on the right hand side of the figure is a quadfilar arrangement with balanced inductances as seen from the filar crossings in the central region of the arrangement. The tables of inductances and currents are as described above with reference to the trifilar construction of FIG. 5;

FIG. 9 is a thermal image of the magnetic structure associated with a winding arrangement;

FIG. 10 is a plan view of part of a magnetic structure;

FIG. 11 is a thermal image of the magnetic structure associated with a winding arrangement;

FIG. 12 is a plan view of part of a magnetic structure adjacent to the winding arrangement which in use is located immediately above the structure;

FIG. 13 is a thermal image of the magnetic structure associated with a winding arrangement;

FIG. 14 is a perspective view of a quadfilar winding arrangement of three turns including four substantially equally spaced filar crossings per turn;

FIGS. 15 to 17 are partial side elevations in longitudinal cross section of a magnetic structure and winding arrangement;

FIGS. 18 to 20 are partial side elevations in transverse cross section of a magnetic structure and winding arrangement.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over any other embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from one magnetic flux coupling structure to another without the use of physical electrical conductors (e.g., power may be transferred through free space). The power output into a wireless field (e.g., a magnetic field) may be received, captured by, or coupled by a receiving power transfer structure, such as a winding to achieve power transfer. The term windings is intended to refer to a component that may wirelessly output or receive energy for coupling to another winding. The winding may typically be magnetically associated with a physical magnetically permeable material of the structure such as a ferrite core. Physical cores including ferromagnetic or ferromagnetic materials may allow development of a stronger electromagnetic field and improved coupling. It should be noted that a winding is not necessarily wound around a core.

A winding comprises one or more turns of conducting material. The term coil may be used in both the sense of meaning any part of a winding arrangement of electrically conducting material and in the sense of a localised arrangement having a number of turns of conducting material that all go around a single central point. A winding as described herein can take a number of different shapes and may comprise a single coil or a number of coils. The term coil is used for convenience with reference to FIGS. 1 and 2, but the person skilled in the art will appreciate that use of the term with reference to those figures may be substituted with references to a winding.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
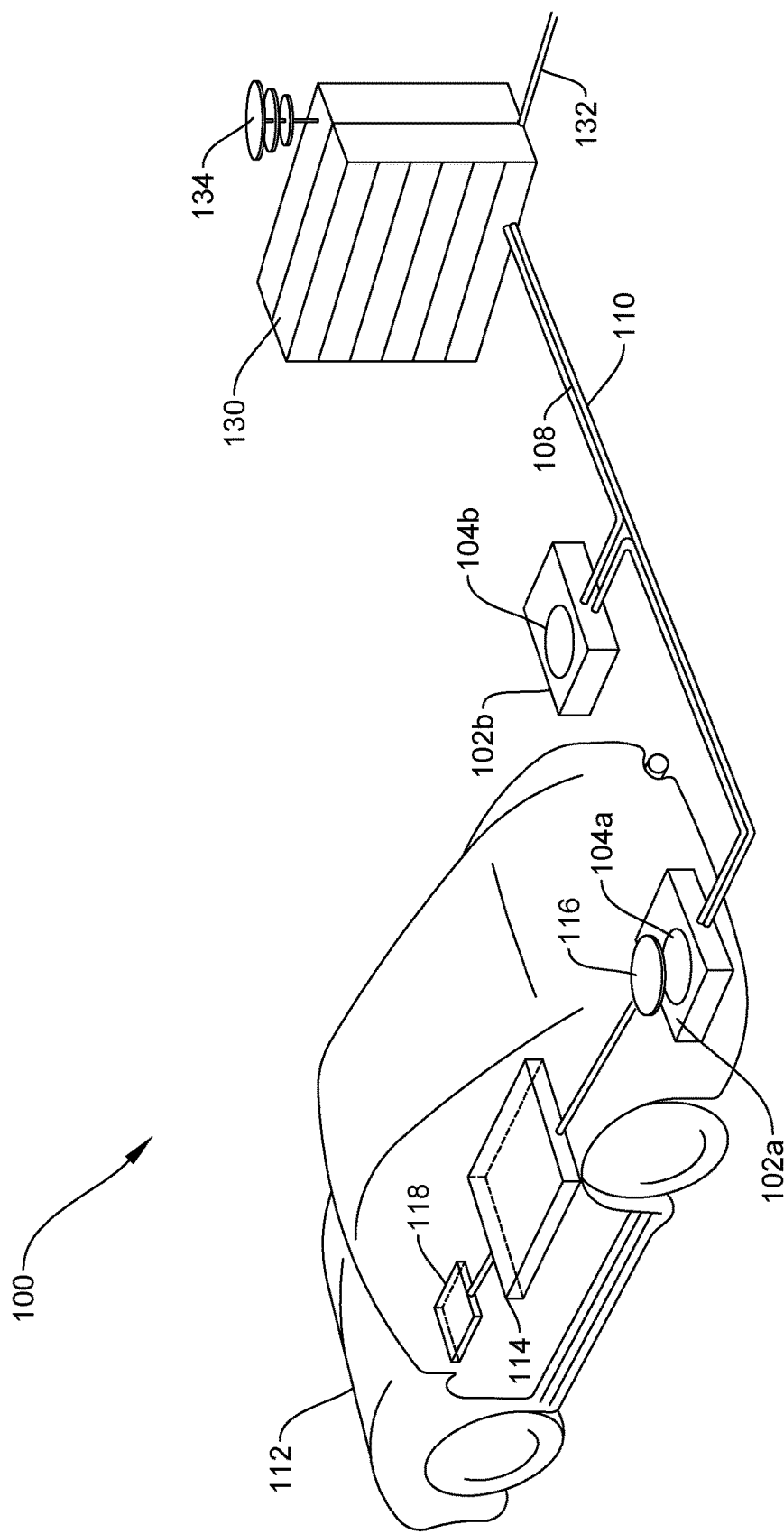
FIG. 1 is a diagrammatic illustration of an IPT system for a vehicle application.

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution centre 130 may be connected to a power backbone 132 and configured to provide an alternating current (AC) or a direct current (DC) supply through a power link 110 to the base wireless charging system 102a. The base wireless charging system 102a also includes a base system coil 104a for wirelessly transferring or receiving power. An electric vehicle 112 may include a battery unit 118, an electric vehicle coil 116, and an electric vehicle wireless charging system 114. The electric vehicle coil 116 may interact with the base system coil 104a for example, via a region of the electromagnetic field generated by the base system coil 104a.

In some exemplary embodiments, the electric vehicle coil 116 may receive power when the electric vehicle coil 116 is located in an energy field produced by the base system coil 104a. The field corresponds to a region where energy output by the base system coil 104a may be captured by an electric vehicle coil 116. In some cases, the field may correspond to the "near field" of the base system coil 104a. The near-field may correspond to a region in which there are strong reactive fields resulting from the currents and charges in the base system coil 104a that do not radiate power away from the base system coil 104a. In some cases the near-field may correspond to a region that is within about $\frac{1}{2\pi}$ of the wavelength of the base system coil 104a (and vice versa for the electric vehicle coil 116) as will be further described below.

Local distribution 130 may be configured to communicate with external sources (e.g., a power grid) via a communication backhaul 134, and with the base wireless charging system 102a via a communication link 108.

The base wireless charging system 102a may be located in a variety of locations. As non-limiting examples, some suitable locations include a parking area at a home of the electric vehicle 112 owner, parking areas reserved for electric vehicle wireless charging modelled after petroleum-based filling stations, and parking lots at other locations such as shopping centres and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors can be avoided, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
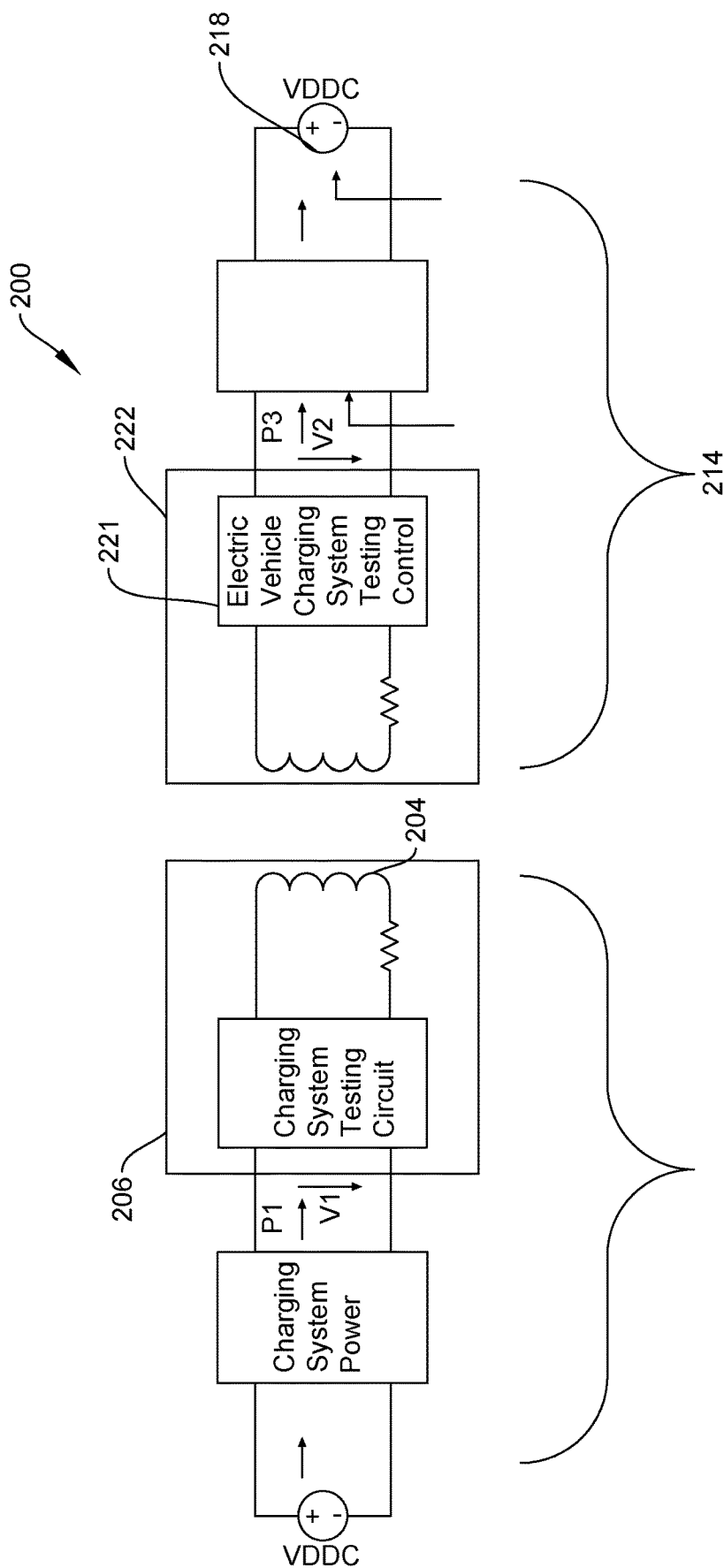
FIG. 2 is a circuit diagram of an IPT system such as that illustrated in FIG. 1.

FIG. 2 is a schematic diagram of exemplary key components of the wireless power transfer system 100 of FIG. 1. As shown in FIG. 2, the wireless power transfer system 200 may include a base system transmit circuit 206 including a base system coil 204 having an inductance L1. The wireless power transfer system 200 further includes an electric vehicle receive circuit 222 including an electric vehicle coil 216 having an inductance L2. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including a coil (e.g., the base system coil 204) as described above. As shown in FIG. 2, inductance may generally be the inductance of the coil, whereas, capacitance may be added to the coil to create a resonant structure at a desired resonant frequency. As a non-limiting example, as shown in FIG. 2, a capacitor may be added in series with the coil to create a resonant circuit (e.g., the base system transmit circuit 206) that generates an electromagnetic field, which may be referred to as a series-tuned resonant circuit. Accordingly, for larger diameter coils, the value of capacitance for inducing resonance may decrease as the diameter or inductance of the coil increases. Inductance may also depend on a number of turns of a coil. Furthermore, as the diameter of the coil increases, the efficient energy transfer area of the near field may increase.

Other resonant circuits are possible. As another non limiting example, a capacitor may be placed in parallel between the two terminals of the coil (e.g., a parallel resonant circuit, alternatively referred to as a parallel-tuned resonant circuit). Furthermore an coil may be designed to have a high quality (Q) factor to improve the resonance of the coil.

The coils may be used for the electric vehicle coil 216 and the base system coil 204. Using resonant structures for coupling energy may be referred to as "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power P1 to the base system transmit circuit 206 including a base charging system tuning circuit 205 which may consist of reactive tuning components in a series or parallel configuration or a combination of both with the base system coil 204 to emit an electromagnetic field at a desired frequency. In one embodiment, a capacitor may be provided to form a resonant circuit with the base system coil 204 that resonates at a desired frequency.

The base system transmit circuit 206 including the base system coil 204 and electric vehicle receive circuit 222 including the electric vehicle coil 216 may be tuned to substantially the same frequencies and may be positioned within the near-field of an electromagnetic field transmitted by one of the base system coil 204 and the electric vehicle coil 216. In this case, the base system coil 204 and electric vehicle coil 216 may become coupled to one another such that power may be transferred to the electric vehicle receive circuit 222 including an electric vehicle charging system tuning circuit 221 and electric vehicle coil 216. The electric vehicle charging system tuning circuit 221 may be provided to form a resonant circuit with the electric vehicle coil 216 that resonates at a desired frequency. The mutual coupling coefficient resulting at coil separation is represented in the diagram by k(d). Equivalent resistances Req1 and Req2 represent the losses that may be inherent to the coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle coil 216 and electric vehicle charging system tuning circuit 221 receives power P2 and provides the power P2 to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power PLDC to charge the electric vehicle battery unit 218. The power supply 208, base charging system power converter 236, and base system coil 204 may be stationary and located at a variety of locations as discussed above. The battery unit 218, electric vehicle power converter 238, and electric vehicle coil 216 may be included in an electric vehicle charging system 214 that is part of electric vehicle 112 or part of the battery pack (not shown). The electric vehicle charging system 214 may also be configured to provide power wirelessly through the electric vehicle coil 216 to the base wireless power charging system 202 to feed power back to the grid. Each of the electric vehicle coil 216 and the base system coil 204 may act as transmit or receive coils based on the mode of operation.

Further, the electric vehicle charging system 214 may include switching circuitry (not shown) for selectively connecting and disconnecting the electric vehicle coil 216 to the electric vehicle power converter 238. Disconnecting the electric vehicle coil 216 may suspend charging and also may adjust the "load" as "seen" by the base wireless charging system 102a (acting as a transmitter), which may be used to decouple the electric vehicle charging system 214 (acting as the receiver) from the base wireless charging system 202. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system coil 204.

As described above, in operation, assuming energy transfer towards the vehicle or battery, input power is provided from the power supply 208 such that the base system coil 204 generates a field for providing the energy transfer. The electric vehicle coil 216 couples to the radiated field and generates output power for storage or consumption by the electric vehicle 112. As described above, in some embodiments, the base system coil 204 and electric vehicle coil 116 are configured according to a mutual resonant relationship such that when the resonant frequency of the electric vehicle coil 216 and the resonant frequency of the base system coil 204 are very close or substantially the same. Transmission losses between the base wireless power charging system 202 and electric vehicle charging system 214 can be reduced when the electric vehicle coil 216 is located in the near-field of the base system coil 204.

As stated, an efficient energy transfer occurs by coupling a large portion of the energy in the near field of a transmitting coil to a receiving coil rather than propagating most of the energy in an electromagnetic wave to the far-field. When in the near field, a coupling mode may be established between the transmit coil and the receive coil. The area around the coils where this near field coupling may occur is referred to herein as a near field coupling mode region.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting coil to the receiving coil residing within a region (e.g., within a predetermined frequency range of the resonant frequency, or within a predetermined distance of the near-field region) where this near field is established rather than propagating the energy from the transmitting coil into free space.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle coil 116 within the electric vehicle 112 to be adequately aligned with a base wireless charging system 102a within an associated parking area.

As discussed above, the electric vehicle charging system 114 may be placed on the underside of the electric vehicle 112 for transmitting and receiving power from a base wireless charging system 102a. For example, an electric vehicle coil 116 may be integrated into the vehicle's underbody near a centre position providing maximum safety distance in regards to EM exposure and permitting forward and reverse parking of the electric vehicle.

Figure 3:
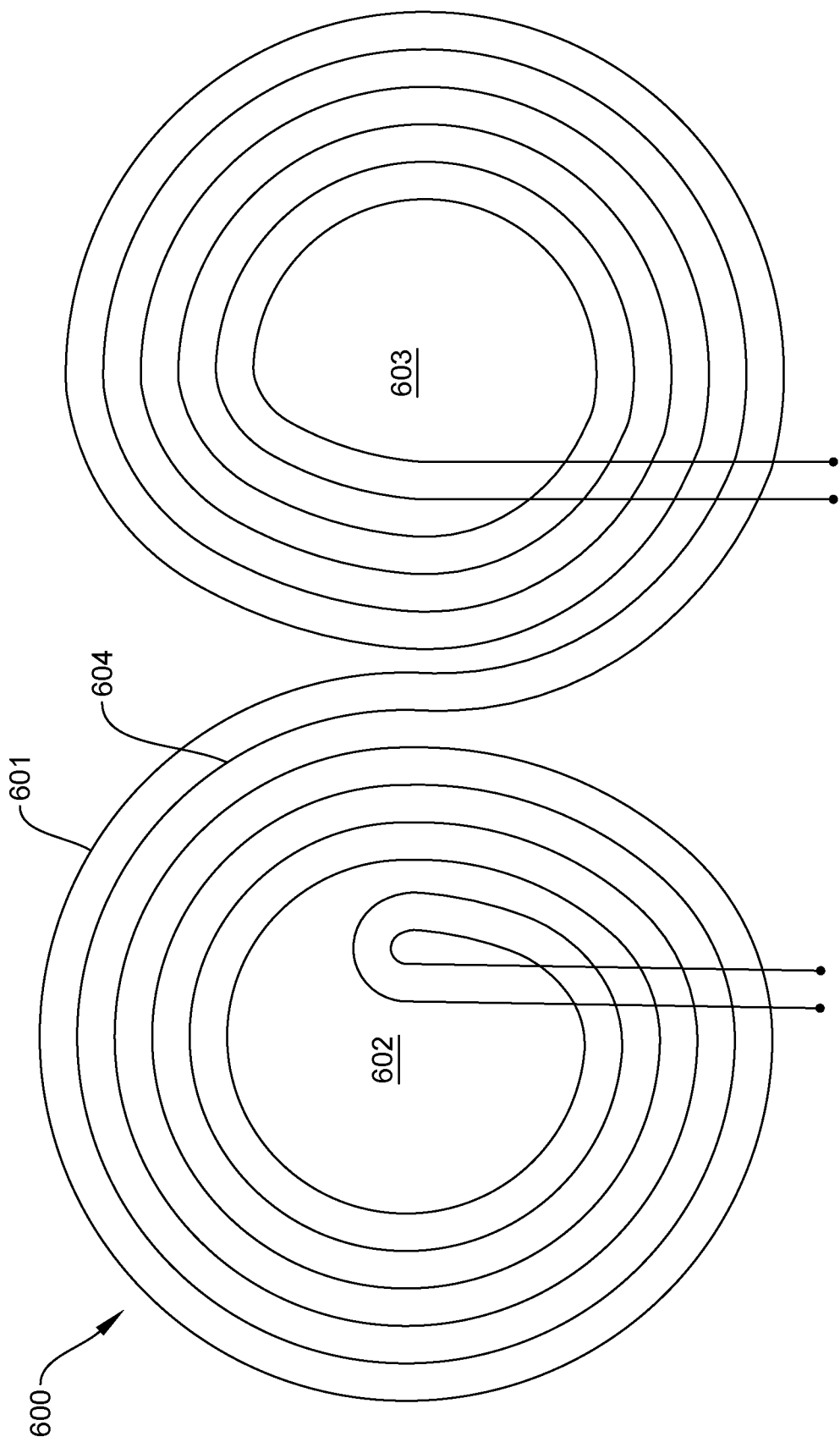
FIG. 3 is a diagrammatic plan view of a bifilar winding arrangement comprising two coils, (the general form of single winding two coil arrangement being referred to in this document as a DD or DoubleD winding arrangement)

According to some embodiments of the invention, a coil comprises lengths of conducting material wound in a plurality of individual coils. For example, FIG. 3 is a diagram of a winding arrangement 600 of two lengths of conducting material being filars 601 and 604 are used in a coil according to one embodiment of the invention. Conducting material 601 and 604 may be any suitable material formed of electrically conducting media and may include wires and the like. In one embodiment, conducting material 601 and 604 comprises litz wire because of its advantageous properties of reducing the skin effect and the proximity effect when carrying alternating currents. A "length of conducting material" i.e. a wire or filar may be formed from one or more smaller lengths connected together in a way whereby the longer length acts like a single length of conducting material. For example, lengths of wire may be wound, tied, plugged, fused, soldered or the like together to form a longer length of wire.

In winding arrangement 600, lengths of conducting material 601 and 604 are wound into an arrangement comprising two substantially co-planar coils 602 and 603 positioned generally adjacent one another. The lengths of conducting material 601 and 604 are wound in a spiral arrangement, that is, an arrangement such that each coil 602 and 607 is formed from a spiral of loops of increasing radius where the length of conducting material does not cross over itself within each coil. The ends of conducting material 601 and 604 form terminals 605 and 606 that, in use, are electrically connected to a power source or battery in a wireless power transfer system.

Coils 602 and 603 are wound in opposition such that one is wound clockwise and the other is wound counter-clockwise. In this way, coils 602 and 602 are wound such that electric current passing through the lengths of conducting material flows in the same direction in adjacent portions of the two coils. Furthermore, when used in a coil, the two coils 602 and 603 may be positioned in magnetic association with one or more magnetically permeable members. For example, the coils may be positioned on top of a core formed of a number of parallel ferrite bars. As a result, when alternating current is passed through the coil, the coils 602 and 603 act as pole areas and lines of magnetic flux arc between them in the form of a "flux pipe" above the coils, a zone of high flux concentration. A pick-up coil can be positioned within the flux pipe to achieve wireless, or more specifically inductive, power transfer. Advantageously, the arrangement results in little leakage of flux below the coils on the side of the core.

The two coils 602 and 603 are formed from the same length of conducting material wound continuously around the coils.

As will be apparent from the description above a multifilar winding is a winding that is wound using two or more filars, that is to say wires, provided in parallel. The parallel wires are joined at each of the two end terminals of the winding. Each wire can carry a rated current and hence multiple filars in parallel can be used to conduct a greater overall magnitude of current.

A problem with the multiple parallel wires forming a multifilar winding is ensuring that the current distribution among all the parallel paths be substantially equal. This means that not only the self-inductance of each parallel path created by the constituent wires should be the same, or substantially the same, but the mutual inductance between the various parallel paths must also be substantially balanced.

The self-inductance of each parallel path can be made equal by ensuring that the mean area circumscribed by each parallel path is equal. As shown in FIG. 4 using a trifilar winding 310 comprising filars 311, 312 and 313 sitting on a slab of ferrite material simulated in 2D, the area covered by each of the three constituent parallel conductors is made equal to each other by twisting them such that the outer conductor on one end becomes the inner conductor on the other end. The resultant inductance matrix (also shown in FIG. 1) for the three mutually coupled inductances shows that their self-inductances are well matched (i.e., diagonal quantities in the matrix), but the resulting current distribution shows that the two outer conductors carry 42.5% of the current each, while the inner conductor carries only 15% of the current. This is because here only the self-inductances of the three parallel paths are matched, while the difference in their mutual inductances causes the non-uniform distribution of current.

In addition to the self-inductance values, we have found that the mutual inductances of the parallel paths can also be balanced out by winding the coil in such a way that each wire forming a parallel path occupies a given position with respect to the other wires for an approximately equal length around each turn. This is shown with the help of an example in FIG. 5, where a model is used to show a trifilar winding 310 comprising filars 311, 312 and 313 with asymmetric ferrite extension comprising ferrite strips 315 on one side of the coil. The results in the accompanying FIG. 5 show that this winding arrangement results in an almost uniform current distribution between the three parallel paths.

It has been concluded after simulating and experimentally verifying various cases that a uniform current distribution across the filars can be achieved for an M-filar winding, i.e. a multifilar winding comprising M filars, by transitioning or crossing over the position of the constituent wires M times per turn. This way it is ensured that each of the M filars (wires) takes each of the M possible positions for a substantially equal length with respect to the remaining M−1 filars within each turn. Thus in an ideal situation, for a mulitfilar winding comprising one or more turns of M filars, each filar crosses the other filars M times per turn. Again in an ideal situation the length of each filar between crossing points is equal. However, we have found that is some situations a satisfactory current distribution can be achieved with some variations. For example, if a multifilar winding having an odd number of filars is used, it may still be more practically convenient to have an even number of crossing points per turn. Our evaluations have shown that, for an M filar winding, an acceptable current distribution can still be achieved if each filar crosses the other filars M times per turn, or M−1, or M+1 times per turn. Moreover, as described above, a magnetically permeable material may be used with the winding. Characteristics of this material may affect the manner in which the winding is formed. For example, a physical characteristic of the permeable material may have an effect. In one embodiment, as will be described further below, one or more recesses or gaps in the permeable material may provide a physical location at which the crossing points can be located. Such a gap or recess allows the additional thickness or height created by crossing the filars to be accommodated by having one or more of the filars resting in the gap or recess so that the winding profile can still be kept as low as possible. A magnetic characteristic of the permeable material may also affect the location of the crossing points and whether they are evenly spaced, for example the relative permeability of different regions of the magnetic structure formed by use of the permeable material.

Further examples are shown in FIG. 6, which comprises a quadfilar winding 501 having four equally spaced crossing points 502-505 according to the principles discussed above. FIG. 7 which comprises a single quadfilar winding 701 having two coils arranged as discussed with reference to FIG. 3. The filars are referenced 702-705 and the crossing points are generally referenced 706.

In operation of IPT magnetic coupling structures, heating tends to occur, particularly in the magnetically permeable material. Balancing currents in the wires comprising the coil(s) assists with alleviating this problem, however it still persists, particularly under high power conditions.

To illustrate the problem of ferrite heating at higher power, pad 801 shown in FIG. 8 is a design of a nominally 10 kW pad for roadway wireless power transfers, which as designed should operate with an average flux density of 0.2 T (below saturation which is around 0.27-0.3 T). This design consists of 7 rows of ferrite bars 802 consisting of 8 bars of I93 ferrite taped together with filament tape. The winding 803 consisted of 6 turns of 50 A wire in a bifilar arrangement and is designed to be driven with 100 Amps, giving a total NI of 600 ampere- turns. However, in practice when the winding is driven at 70 amps the outer ferrite bars heat up to about 170° C., and this heating is centred around the joining gaps (where the individual ferrite bars abut each other).

An experiment was carried out running the pad at 50 amps to look at the thermal behaviour of the pad. After approximately 25 minutes the ferrite cores had reached a maximum temperature of 105° C., as shown in FIG. 9.

As can be seen, the two ferrite bars on the outside of the pad are operating at a higher temperature than the bars in the middle, and heating again occurs at the point where the two bars abut. The outer point heats up considerably due to the concentration of the magnetic flux at this point, as it is at this point that the adjacent coils begin to turn.

One solution is to add additional ferrite 1010 between the two outer bars of ferrite as shown below in FIG. 10.

It has been found that this extra ferrite 1010 helps to significantly reduce the heating in the ferrite bars.

Although additional ferrite can have a beneficial effect in reducing heat, we have found that thermal issues principally arise at connection points between pieces or "blocks" of ferrite, where partial saturation can occur from unequal touching creating fringing flux. Once the temperature rises above 85-90 degrees Celsius it begins to further increase significantly, and therefore this needs to be avoided.

Generally, the objective in pad construction is to carefully grind the edges of all the ferrite blocks that are adjacent to each other to form the contiguous magnetic structure. Then the ground edges are placed next to each other so that they abut each other, and pressure is applied to the ferrite blocks to ensure that there is no gap between adjacent or neighbouring blocks, and thus achieve maximum physical connection. In some cases, ferrite blocks are laid beside or on top of each other as shown in FIG. 10, to span an abutting edge between two other blocks in an attempt to maximise the physical connection and provide a lower reluctance path, but this only raises the average B field and the potential for loss.

A completely new approach has been adopted. Instead of trying to minimise gaps, deliberate but controlled gaps have been introduced between ferrite blocks. This prevents partial saturation of the highly permeable material by effectively increasing the overall reluctance of the magnetic structure, and thereby reduces the effective relative permeability of the magnetic structure. The gaps can be used to control the field intensity in the structure by controlling the reluctance of the magnetic structure dependent on the required application. The gaps can also be selected and located to control reluctance at points or regions of the structure. With a structure such as that shown in FIG. 8, introduction of controlled gaps can be used to reduce the overall permeability from an ideal all-ferrite strip structure with a relative magnetic permeability of 2500 to a reduced permeability of around 100-300.

The relative permeability can be calculated based on the dimensions of the permeable (for example ferrite) structure. In the examples discussed in this document, the structure comprises a number of elongate strips of ferrite material, such as strips 802 in FIG. 8. Knowing the overall length of the strip, the relative permeability of high permeability material such as ferrite, and that of the lower permeability separating material (if any) that provides the gaps, allows the number and dimensions of the gaps to be selected to arrive at a required overall relative permeability. Each material in the structure has a known reluctance, and the reluctances can be combined in an analogous manner to resistances in an electric circuit. Thus, reluctances can be added in series or parallel dependent on the physical arrangement of the components of the magnetic circuit. For example, the reluctance of the pieces of ferrite arranged in a length such as strip 802 may be calculated and compared with an acceptable overall reluctance for that strip with added gaps. The additional reluctance can then be assigned to a gap or gaps. Knowing the reluctance of the material of the gap allows a distance for the or each gap to be calculated. For example if the "material" to be used for the gaps is air, then there may be gaps of one size, whereas if an alternative material is used then the gaps may be of another size.

The required overall relative permeability will depend on the wireless transfer application for which the magnetic structure is to be used. For example, if the gap between the primary wireless power transfer structure and the secondary (or pick-up) wireless power transfer structure is relatively small, then a lower overall relative permeability for the structures is acceptable. A lower overall relative permeability is acceptable with small separation distances between structures because the magnetic field generated by a primary structure will not need to extend as far for coupling with a secondary structure. Also, the permeable magnetic material in the secondary structure is closer to the permeable magnetic material of the primary structure which facilitates magnetic coupling. These small separation distance applications may include desktop charging applications for example, in which the device receiving power can be located immediately adjacent to the primary magnetic structure. In these applications, the overall relative permeability may be as low as 50.

If the gap between the primary wireless power transfer structure and the secondary (or pick-up) wireless power transfer structure is relatively large, then a higher overall relative permeability for at least the primary structure will be required. A higher overall relative permeability is required with larger separation distances between structures because the magnetic field generated by a primary structure will need to extend over a significant distance to allow effective coupling with a secondary structure. An example is charging or power roadway vehicles, where the separation distance may be 300 mm. In these applications the overall relative permeability of the primary structure may be substantially 200, 300 or 400, or significantly more. For separation distances that fall between the examples referred to above, it will be seen that the range of relative permeability may vary dependent on the application. In some constructions, the range will be greater, for example 50-2000; in others, it can be 50-500, or 100-500.

The gaps in the highly permeable magnetic material can be provided at locations in order to prevent partial magnetic saturation at selected points or regions of the primary structure. Partial saturation occurs when the applied external magnetic field H ceases to have a significant effect the magnetization of the material further, so the total magnetic flux density B starts to fall way. Points or regions in the primary magnetic structure may be prone to partial saturation. These points include those immediately adjacent to the current carrying conductor(s) of filars that are magnetically associated with the primary structure. Gaps in the highly permeable ferrite may be provided at these points or regions in order to provide points or regions of reduced permeability to control the field intensity (the B field) at these areas of the structure and therefore prevent partial saturation from occurring. This is discussed further below with reference to FIGS. 15 and 16.

Although the term "gaps" has been used in this document, it will be understood that this refers to defined regions of reduced relative magnetic permeability. The gaps may comprise air in some examples, but may also comprise other materials of lower relative permeability relative to the highly permeable material which comprises the majority of the structure, as described further below.

This reduced permeability (or increased reluctance) has three clear improvements. The first is that it reduces the average flux density and this helps mitigate core loss, yet this has little impact on the coupling flux to a secondary given there is already a large air-gap in the flux paths and these additional small gaps make little difference. It mitigates the possibility of fringing flux at the edges, as there are no partial connections. It also provides mechanical flexibility in the form of flex zones (analogous to cutting groves in concrete stops cracking at other locations in concrete pavement slabs). Thus under loading the ferrite blocks can move relative to each other with no or minimal friction.

When small air gaps are added between the ferrite bars (in the middle of the bar) to the ferrite strip 1110 on the far right as shown in FIG. 11, the heating in the core was greatly reduced, due to the lower flux density in that bar.

To demonstrate the impact of increasing the volume of ferrite versus gapped ferrite, two layers of the ferrite blocks 1210 were placed on top of each other on the left, as shown in FIG. 12. In the centre, the ferrite strips 1220 and no gaps, and on the far right the ferrite strip 1230 had a single gap 1240 placed in it at the connection of the two middle ferrite I93 bars (FIG. 12) of 0.38 mm. The system was run at 67 Amps and the heat pattern is shown in the FIG. 13. The ferrite block at 45° C. was much cooler than the ferrite bars at 80° C.

To evaluate the extent of gapping required, various sized gaps were placed in the ferrite bars. In this experiment the far left ferrite strip was replaced with a strip that had one piece of Mylar between each of middle three ferrite blocks. This single layer of Mylar did not reduce the flux density enough to reduce the heating in the ferrite bars.

Next the gap in the middle of the ferrite bar on the far left was increased to five pieces of Mylar and the system was run again at 67 A. The heating in the far left ferrite bar was greatly reduced from 108° C. to round 80° C.

To test that the gaps were indeed working a traditional solution was added where 3 extra I93 ferrites were placed in between the two outer ferrite bars to bypass the gaps but also to ensure there was good ferrite connection down the length of the ferrite strip. As expected, this forced all of the flux to bypass the gapped area and flow via the additional ferrite sections into the ferrite cores. This essentially increases the permeability and the average B and causes the cores to begin to saturate (not at the gaps). The result was a much higher temperature in the ferrite bar (not centred around the gaps) and shows that high B field should be avoided in order to control the temperature.

By separating the additional ferrite bars (adding a small gap between the outer two ferrite bars) the temperature could be reduced in the outer ferrite bar as the B is forced to reduce.

Increasing the gap between the two additional added bars and the original ferrite strips to three Mylar sheets, and pushing the ferrite bars next to each other, resulted in a much more even heat distribution throughout the ferrite structure.

The structure above was further modified by adding ferrite under the middle part of the structure to double the thickness of the two outer ferrite bars. A structure that includes this feature is shown in FIG. 14 which has a quadfilar winding with crossed filars to provide even current distribution. This construction which includes ideally both even current distribution and a ferrite structure with selected gaps or spaces between ferrite blocks together with the appropriate volume of ferrite significantly evens and reduces the heating in the pad structure. FIG. 14 shows an embodiment with a quadfilar winding 1401 which includes this magnetic structure 1402.

An example of an arrangement of ferrite pieces or blocks which are spaced according to the disclosure above is shown in cross section in FIG. 15. In that Figure, three blocks 1501, 1502, and 1503 are shown arranged side by side in cross section to form a ferrite strip 1505, which sits below wires or filars 1508. The spaces between neighbouring blocks define gaps 1506 and 1507. In FIG. 15 gaps 1506 and 1507 are empty, but as described above various materials may be used to fill the gaps and assist in defining the separation distance. Individual pieces 1601 of a non-conductive material such as Mylar sheet which is less than 1 mm thick may be used as convenient spacers for example, as shown in FIG. 16. In this example, the gaps 1506 and 1507 are located to prevent partial saturation at points in the permeable material adjacent to the current carrying conductors 1508 where there is a significant H field. The two groups of filars 1508 each represent a separate coil of a DD winding construction, so the permeable material comprising ferrite block 1502 is located between the poles associated with each coil. It will be seen that the ferrite block 1502 is substantially continuous, so that the reluctance is low (permeability is high or maximised) to maintain the field within the permeable material between the poles in use, preventing it from escaping in the region of the structure between the poles that is not covered or bound by filars. As shown in this example, it is beneficial to locate a gap, or gaps, at regions where the conductors cross the lengths of permeable material transversely, since the field in the permeable material is particularly intense at these points.

In FIG. 17 a double layer of ferrites blocks is shown through use of additional blocks or pieces 1701-1703, this time using single pieces of spacer material 1601.

As described above, in some embodiments the permeable material used in the magnetic structures is arranged in lengths or elongate strips. Heat transfer apparatus may be located between strips in order to redistribute heat and thus even the overall thermal profile or properties of the structure. Thus in one embodiment a heat pipe may be used in between ferrite strips to assist in heat transfer. FIG. 18 shows part of a magnetic structure in cross section in which ferrite strips 1801 and 1802 have a heat pipe 1803 located parallel to, or at least in thermal contact with, the adjacent strips, to transfer heat between and/or away from the strips. A backing plate 1804 may also be provided and the heat pipe may also transfer heat to the backing plate. Electrically insulating sheet material 1805 may be used between the filars and the ferrite, and between the backplate and the ferrite. As shown in FIG. 19, it is possible for the heat pipe to be formed in such a way that it accommodates a space of wires or filars 1901 and 1902 which may be run along the heat pipe to exit the arrangement at a termination such as a connection to a power supply. As shown in FIG. 20, the heatpipe may also be formed to allow a space to accommodate filar crossover points without adding to the overall height or thickness of the winding arrangement. The heat pipe is formed from non-conductive materials such as an outer plastic casing carrying an appropriate medium such as water under a vacuum.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible exemplary embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A magnetic structure for a magnetic flux coupling apparatus, the structure comprising:
    a plurality of pieces of magnetically permeable material arranged along a first dimension, each piece being separated from a neighbouring piece by a gap defining a separation distance;
    a conductor magnetically associated with the magnetically permeable material,
    wherein the separation distance is selected to prevent partial saturation of a selected region of the structure,
    wherein the selected region is adjacent to the conductor, or a plurality of turns of the conductor, and
    wherein the conductor comprises a multifilar winding comprising one or more turns wherein each filar crosses the other filars at a crossing point such that the inductance of each filar is substantially the same, and the crossing point is located in between the lengths of permeable material.

2. A magnetic structure for a magnetic flux coupling apparatus, the structure comprising:
    a plurality of pieces of magnetically permeable material arranged along a first dimension, each piece being separated from a neighbouring piece by a gap defining a separation distance,
    wherein the separation distance is selected to prevent partial saturation of a selected region of the structure, and
    wherein the separation distance provides an overall lower relative permeability for the structure relative to the relative permeability of the magnetically permeable material.

3. A magnetic structure for a magnetic flux coupling apparatus, the structure comprising:
    a plurality of pieces of magnetically permeable material arranged along a first dimension, each piece being separated from a neighbouring piece by a gap defining a separation distance,
    wherein the separation distance is selected to prevent partial saturation of a selected region of the structure, and
    wherein the pieces of magnetically permeable material may move relative to each other in a direction transverse to the first dimension.

4. The magnetic structure as claimed in claim 1 wherein the plurality of pieces of magnetically permeable material comprises a length of permeable material, and the magnetic structure comprises a plurality of lengths of permeable material.

5. The magnetic structure as claimed in claim 4 wherein the lengths are arranged in parallel to form a plane.

6. The magnetic structure as claimed in claim 5 wherein a heat transfer means is provided between the lengths.

7. The magnetic structure as claimed in claim 3, wherein a heat transfer means is provided between the plurality of pieces of magnetically permeable material, and wherein the heat transfer means comprises a heat pipe.

8. The magnetic structure as claimed in claim 2 wherein the gap comprises a low permeability material having a lower relative permeability than the magnetically permeable material.

9. The magnetic structure as claimed in claim 8 wherein the separation distance and the low permeability material are selected to prevent partial saturation of the selected region.

10. The magnetic structure as claimed in claim 2, further comprising a conductor magnetically associated with the ferrite.

11. The magnetic structure as claimed in claim 10 wherein the selected region is adjacent to the conductor, or a plurality of turns of the conductor.

12. The magnetic structure as claimed in claim 11, wherein the conductor, or a plurality of turns of the conductor, is arranged substantially transverse to the first dimension at the selected region.

13. The magnetic structure as claimed in claim 1, wherein the conductor is wound to provide two poles, and the gap is positioned to provide high or maximum relative permeability between the poles.

14. The magnetic structure as claimed in claim 11 wherein the conductor comprises a mulitfilar winding comprising one or more turns wherein each filar crosses the other filars at a crossing point such that the inductance of each filar is substantially the same, and the crossing point is located in between the lengths of permeable material.

15. A magnetic flux coupling apparatus comprising a mulitfilar winding having one or more turns,
   wherein the filars are physically arranged relative to each other,
   wherein each filar crosses the other filars at a crossing point such that the inductance of each filar is substantially the same.

16. The apparatus as claimed in claim 15 further including a magnetically permeable material magnetically associated with the multifilar winding.

17. The apparatus as claimed in claim 16 wherein the crossing point is located dependent on a characteristic of the permeable material.

18. The apparatus as claimed in claim 16 wherein the characteristic comprises a gap or recess in the permeable material.

19. A magnetic structure for a magnetic flux coupling apparatus, the structure comprising:
   a plurality of lengths of magnetically permeable material arranged substantially in parallel, wherein the lengths are separated from neighbouring lengths by a gap defining a separation distance, and wherein a means for heat transfer is provided between at least two of the lengths,
   wherein the magnetic structure is part of a vehicle wireless charging system,
   wherein the separation distance is selected to prevent partial saturation of a selected region of the structure, and
   wherein the separation distance provides an overall lower relative permeability for the structure relative to the relative permeability of the magnetically permeable material.

20. The magnetic structure as claimed in claim 2 further comprising a conductor magnetically associated with the magnetically permeable material, wherein the conductor is located only on one side of the magnetically permeable material.

21. The magnetic structure as claimed in claim 2 wherein the overall lower relative permeability is in the range of 50-2000.

22. The magnetic structure as claimed in claim 2 wherein the overall lower relative permeability is in the range of 50-500.

23. The apparatus as claimed in claim 15 wherein a mean area circumscribed by the filars of the multifilar winding is substantially equal.

24. The apparatus as claimed in claim 15 wherein there are M number of one or more turns, and wherein the filars of the multifilar winding crosses the other filars of the multifilar winding M, or M−1, or M+1 times per turn.

25. The magnetic structure as claimed in claim 2 wherein the plurality of pieces are ferrite pieces, and there are a plurality of gaps that separate neighbouring pieces of the plurality of pieces, and wherein the plurality of gaps reduce the overall permeability of the magnetic structure by 88 to 96 percent from an ideal all-ferrite strip structure.

* * * * *